(12) United States Patent
DeFazio, Jr.

(10) Patent No.: US 9,685,245 B2
(45) Date of Patent: Jun. 20, 2017

(54) REMOTELY INSTALLED FUEL TRANSFER TUBE CLOSURE SYSTEM

(71) Applicant: Preferred Utilities Manufacturing Corporation, Danbury, CT (US)

(72) Inventor: Bernard DeFazio, Jr., Bethel, CT (US)

(73) Assignee: PREFERRED UTILITIES MANUFACTURING CORPORATION, Danbury, CT (US)

( * ) Notice: Subject to any disclaimer, the term of this patent is extended or adjusted under 35 U.S.C. 154(b) by 249 days.

(21) Appl. No.: 14/307,162

(22) Filed: Jun. 17, 2014

(65) Prior Publication Data

US 2015/0071397 A1 Mar. 12, 2015

Related U.S. Application Data

(60) Provisional application No. 61/835,990, filed on Jun. 17, 2013.

(51) Int. Cl.
| | |
|---|---|
| *G21C 1/22* | (2006.01) |
| *G21C 19/02* | (2006.01) |
| *F01D 25/24* | (2006.01) |
| *F16J 13/06* | (2006.01) |
| *G21C 13/06* | (2006.01) |

(52) U.S. Cl.
CPC ............ *G21C 19/02* (2013.01); *F01D 25/243* (2013.01); *F16J 13/06* (2013.01); *G21C 13/06* (2013.01)

(58) Field of Classification Search
CPC ........ G21C 19/00; G21C 19/20; B65D 55/00; E05C 5/02
See application file for complete search history.

(56) References Cited

U.S. PATENT DOCUMENTS

| | | | | |
|---|---|---|---|---|
| 3,404,603 A | * | 10/1968 | Addison | B25D 9/12 173/DIG. 4 |
| 4,519,519 A | * | 5/1985 | Meuschke | G21C 13/0285 138/89 |
| 4,678,620 A | | 7/1987 | Marshall et al. | |
| 5,087,088 A | * | 2/1992 | Milam | E05B 15/0006 292/110 |
| 5,349,614 A | | 9/1994 | Bruner | |
| 5,625,655 A | | 4/1997 | McDonald et al. | |

* cited by examiner

*Primary Examiner* — Marshall O'Connor
(74) *Attorney, Agent, or Firm* — Ware, Fressola, Maguire & Barber LLP

(57) ABSTRACT

A system, method and apparatus for remotely installing a flange cover assembly on a fuel transfer tube fixed flange in a containment pit in a nuclear power plant is presented. In one example, the flange cover assembly includes J-bolt spring assemblies in which the feet of the J-bolt are rotated between a clamping and non-clamping orientation to engage with the rear face of the fixed flange. A tool frame is lowered into the containment pit to engage with the flange cover assembly to compress the J-bolt springs and extend the J-bolt foot toward and away from the flange cover. Dual acting cylinders move a spring compression frame on the frame tool to compress and relax the J-bolt spring assemblies.

6 Claims, 15 Drawing Sheets

130

```
┌─────────────────────────────────────────────────────────┐
│ PROVIDING A FLANGE ASSEMBLY SUITABILITY DIMENSIONED TO  │
│ SEALINGLY COVER THE OPENING IN A FUEL TRANSFER TUBE     │
│ LOCATED IN A CONTAINMENT PIT IN A NUCLEAR POWER PLANT.  │
│                          132                            │
└─────────────────────────────────────────────────────────┘
```

```
┌─────────────────────────────────────────────────────────┐
│ LOWERING THE FLANGE COVER ASSEMBLY DOWN INTO RESTING    │
│ ENGAGEMENT AND ALIGNMENT WITH THE FUEL TRANSFER         │
│ TUBE FIXED FLANGE IN THE CONTAMENT PIT.                 │
│                          134                            │
└─────────────────────────────────────────────────────────┘
```

```
┌─────────────────────────────────────────────────────────┐
│ LOWERING A FRAME TOOL DOWN AND INTO ENGAGEMENT          │
│ WITH THE FLANGE COVER ASSEMBLY.                         │
│                          136                            │
└─────────────────────────────────────────────────────────┘
```

```
┌─────────────────────────────────────────────────────────┐
│ PRESSURIZING AT LEAST ONE HYDRAULIC CYLINDER ON THE     │
│ FRAME TOOL TO MOVE A SPRING COMPRESSION FRAME INTO      │
│ CONTACT WITH THE ENDS OF J-BOLT SPRING ASSEMBLIES       │
│ CIRCUMFERENTIALLY DISTRIBUTED ON THE FLANGE COVER.      │
│                          138                            │
└─────────────────────────────────────────────────────────┘
```

```
┌─────────────────────────────────────────────────────────┐
│ SIMULTANEOUSLY COMPRESSING THE J-BOLT SPRING ASSEMBLIES │
│ TO EXTEND THE J-BOLT FEET BEYOND THE REAR FACE OF THE   │
│ FUEL TRANSFER TUBE FIXED FLANGE.                        │
│                          140                            │
└─────────────────────────────────────────────────────────┘
```

```
┌─────────────────────────────────────────────────────────┐
│ ROTATING THE J-BOLT FEET                                │
│ INTO A CLAMPING OPERATIVE POSITION.                     │
│                          142                            │
└─────────────────────────────────────────────────────────┘
```

```
┌─────────────────────────────────────────────────────────┐
│ RELEASING THE PRESSURE ON THE HYDRAULIC CYLINDER TO     │
│ BRING THE J-BOLT FOOT INTO CLAMPING ENGAGEMENT WITH THE │
│ REAR FACE OF THE FUEL TRANSFER TUBE FIXED FLANGE TO COMPRESS │
│ THE O-RING SEALS BETWEEN THE FLANGE COVER ASSEMBLY AND  │
│ THE FUEL TRANSFER TUBE FIXED FLANGE.                    │
│                          144                            │
└─────────────────────────────────────────────────────────┘
```

FIG. 16

REMOTELY INSTALLED FUEL TRANSFER TUBE CLOSURE SYSTEM

CROSS-REFERENCE TO RELATED APPLICATION

The present application claims priority to provisional application Ser. No. 61/835,990, filed Jun. 17, 2014, which is incorporated herein in full by reference.

FIELD OF THE INVENTION

The present invention relates generally to flange closure systems for fuel transfer tubes in nuclear power plants and deals more particularly with a remotely installed fuel transfer tube system flange closure cover and a tool for installing and uninstalling a flange cover to a fuel transfer tube fixed flange.

The present invention also relates to a method for remotely installing and uninstalling a flange cover on a fuel transfer tube fixed flange.

BACKGROUND OF THE INVENTION

The time it takes to refuel a nuclear power plant is very costly because of the replacement power which has to be purchased during such time. It is common in the operation of nuclear reactors to provide a flange cover to create a full and complete seal between the nuclear power plant's primary containment area and the fuel transfer canal or tube that leads to the fuel storage pool. The fuel storage pool generally contains water and is sunk into the earth for the handling and storage of irradiated reactor components such as control rods or fuel assemblies. In the refueling of a reactor, irradiated or spent fuel assemblies are transferred from the reactor pit to the fuel storage pool for temporary storage. The transfer is accomplished under water to protect operators from the effect of radiation.

When refueling the nuclear power plant it is necessary for operating personnel enter an area that is posted either a high radiation or locked high radiation area or even an airborne contamination area to remove the flange cover on the containment side of the fuel transfer tube. After the refueling is completed the reactor cavity is drained and the operating personnel reenter the containment area to reinstall the flange cover. The flange cover is designed to be structurally sound and to maintain its seal under several design conditions including: normal pressure on the containment side of the flange cover and approximately 15 pounds per square inch (psi) water head on the fuel transfer tube or canal side of the flange cover; accident condition of 45 psi on the containment side of the flange cover and either 15 psi of water head or essentially air and atmospheric pressure on the fuel transfer tube side of the flange cover; and seismic forces simulating the additional pressure burden from an earthquake.

The flange cover generates a seal with two O-rings that are positioned in two spaced grooves machined into the sealing side of the flange. The flange cover is attached to a flat faced weld neck flange on the fuel transfer tube by a number of bolts which must be removed and reinstalled for each refueling event. For example, a typical flange cover might be a 60 inch nominal pipe size flange that is mated to a 60 inch nominal flat faced weld neck flange on the fuel transfer tube. The flange cover is bolted in place using bolts or studs, washers and nuts and a full set might have 44 bolts, nuts and washers. The reinstallation is particularly time consuming and exposes workers to additional radiation dose because the bolts must be tightened to a prescribed torque in several passes in a specified sequence to achieve a full compression on the O-rings seals to assure a leak proof seal.

The manual installation of the flange cover on the fuel transfer tube flange involves two to three operators dressed in contamination protective clothing including filtered air hood or respiratory devices and about an hour to remove the flange cover and about two hours to reinstall it. The containment area is hot and contains sufficient radiologic contamination to expose the operators to significant radiation. These operations are performed in an environment that could have as high as three rem per hour after each refueling. It is known that the longer an operator stays in proximity to radioactive material the greater his/her radiation exposure and therefore it is preferable to minimize any such exposure below the permissible radiation levels specified by government regulations. It is desirable therefore to be able to remove and replace the flange cover so as to reduce both the refueling time and operator radiation exposure.

There have been numerous approaches with the aim of reducing operator exposure to radiation in the removal and reinstallation of the flange cover including reducing the number of bolts to approximately six or eight bolts to bolt the flange cover to the fixed flange on the fuel transfer tube. Although the time an operator is exposed to radiation is somewhat reduced significant exposure still remains.

So called quick release hatches or covers generally have complex latching mechanisms including a plurality of radially outwardly and inwardly slidable locking bolts that must align with and slide into latch receiving openings on a locking ring that is added to the flange weldment on the fuel transfer tube, and therefore are not suitable for use on existing fuel transfer tube flange weldments.

The flange cover also typically includes a test port extending from the exterior containment side of the flange cover to a space between the two O-rings. Air or gas is introduced at a specific pressure and the leakage across the O-ring seals is measured using the appropriate measuring instruments to insure the leakage rate is below 25 standard cubic centimeters per minute. The leakage testing and measuring procedure further extends the radiation exposure time of an operator.

It would be desirable therefore to provide a flange cover that can be remotely installed and/or uninstalled from the fuel transfer tube flange without modification to the existing fuel transfer tube flange. It would also be desirable to remotely test and measure the leakage rate across the O-rings when the flange cover is sealingly attached to the fuel transfer tube flange.

SUMMARY OF THE INVENTION

In accordance with a broad aspect of the invention, a system, method and apparatus for remotely installing a flange cover assembly on a fuel transfer tube fixed flange located in the containment pit of a nuclear power plant is presented. A flange cover assembly includes a plurality of axially oriented J-bolt spring assemblies arranged in a spaced relationship with respect to one another and circumferentially distributed along the periphery of the flange. Each of the J-bolt spring assemblies includes a bolt foot, bolt shank, a capture nut at one end of the bolt shank opposite the bolt foot and a stack of disk springs therebetween. The J-bolt foot is sized and arranged for rotation between a nonclamping and clamping operative position and for axial movement in a direction toward and away from the containment side of the flange cover in response to the stack of disk springs being compressed and relaxed. A tool frame includes a tool hook frame for engagement with the flange cover assembly and a spring compression frame arranged for limited movement toward and away from the tool hook frame between a tool retracted operative position and a tool retracted operative position. Dual acting hydraulic cylinders are used to provide the relative movement between the spring compression frame and the tool hook frame to compress and relax the disk springs on the J-bolt. The residual spring force of the J-bolt spring assemblies in the clamping operative position maintains the flange cover assembly on the fuel transfer tube fixed flange throughout all design considerations.

BRIEF DESCRIPTION OF THE DRAWING

Additional features, benefits and advantages of the present invention will become readily apparent from the following description of examples of the invention taken in connection with the following drawings wherein:

FIG. 16 is a schematic flow chart showing the functional steps of the method embodying the present invention.

DESCRIPTION OF EXAMPLES OF THE INVENTION

Figure 1:
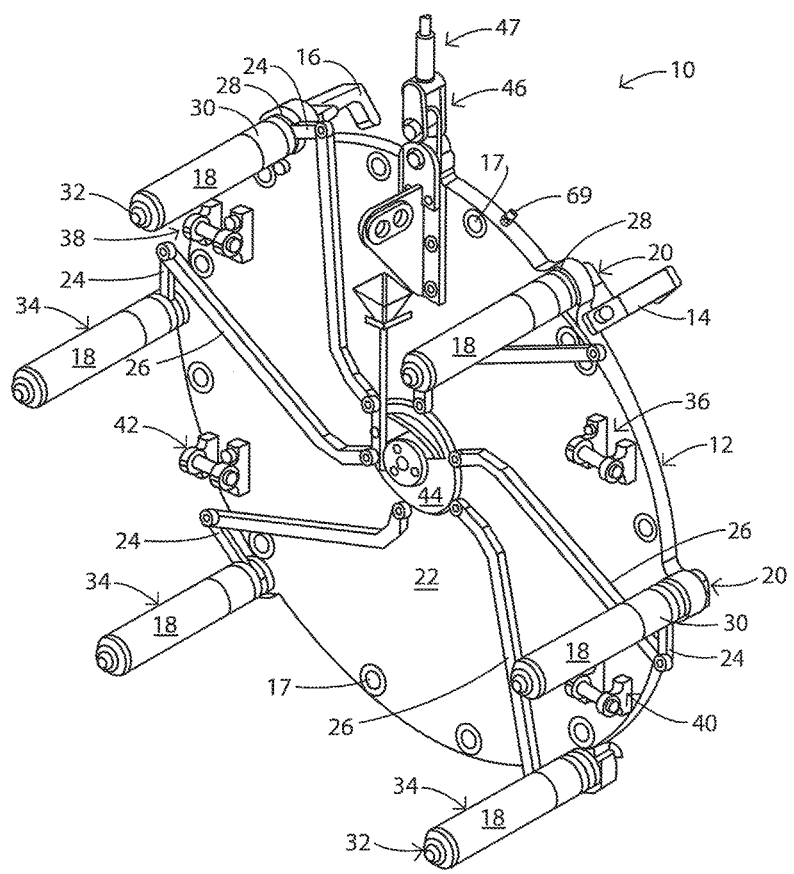
FIG. 1 is a perspective schematic view of the flange cover assembly embodying the present invention as seen from the containment side of the flange cover shown with the J-Bolt feet rotated to the non-clamping operative position.
Figure 2:
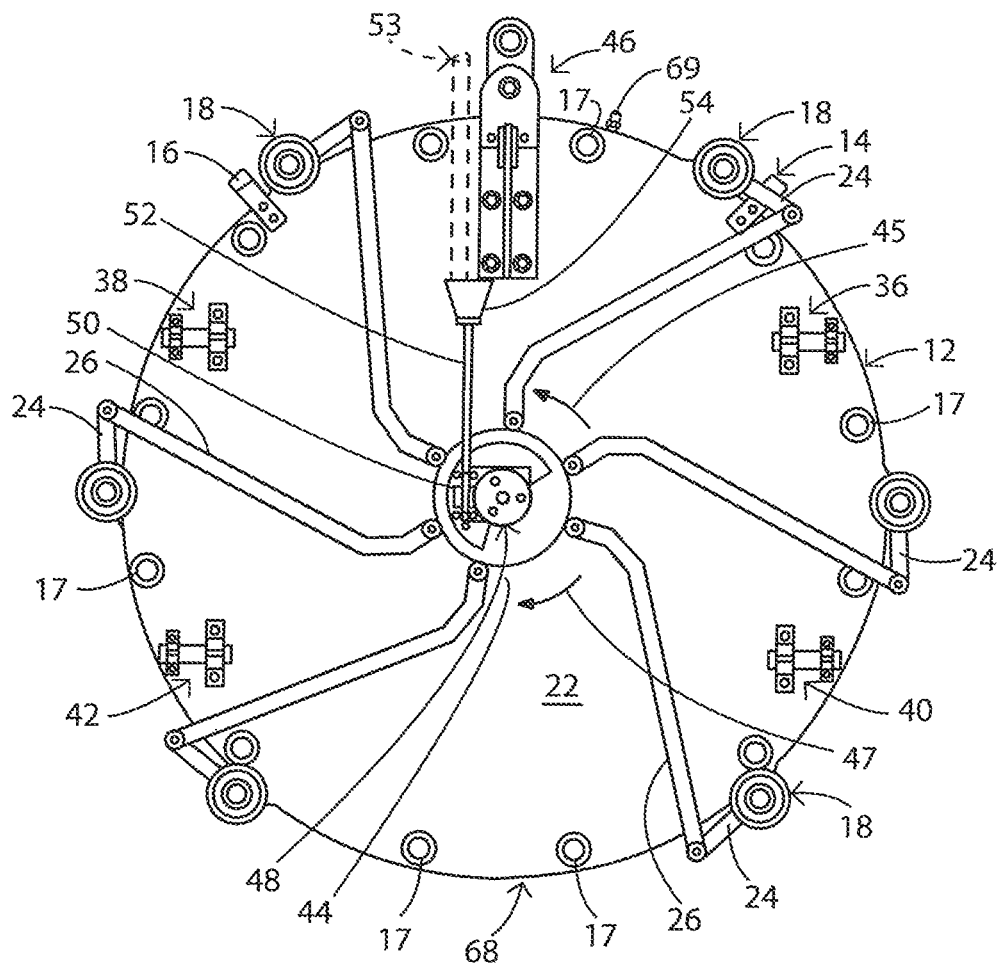
FIG. 2 is a schematic plan view of the containment side of the flange cover assembly illustrated in FIG. 1.
Figure 3:
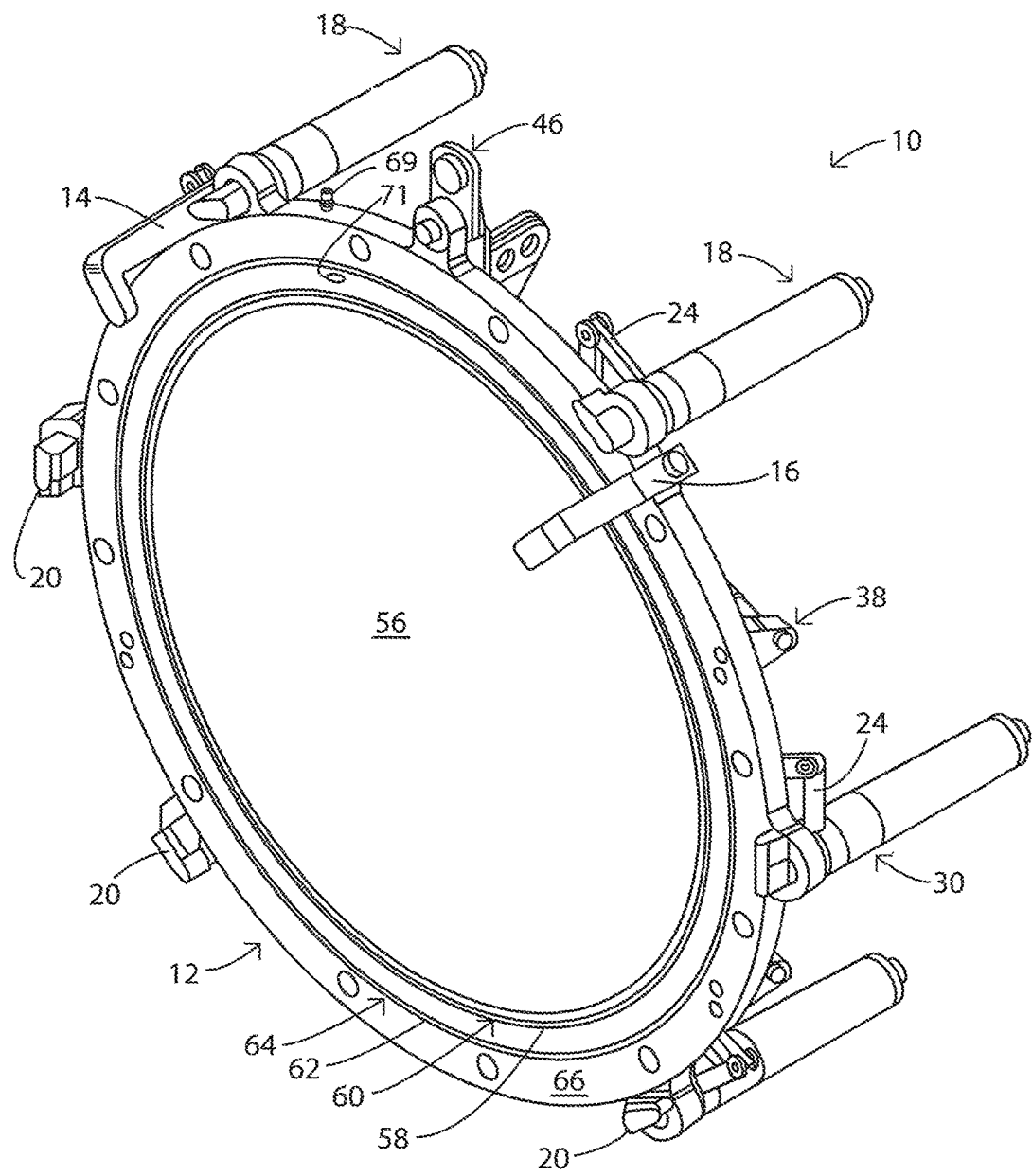
FIG. 3 is a perspective schematic view of the flange cover assembly as seen from the fuel transfer tube side of the flange shown with the J-Bolt feet rotated to the non-clamping operative position.
Figure 4:
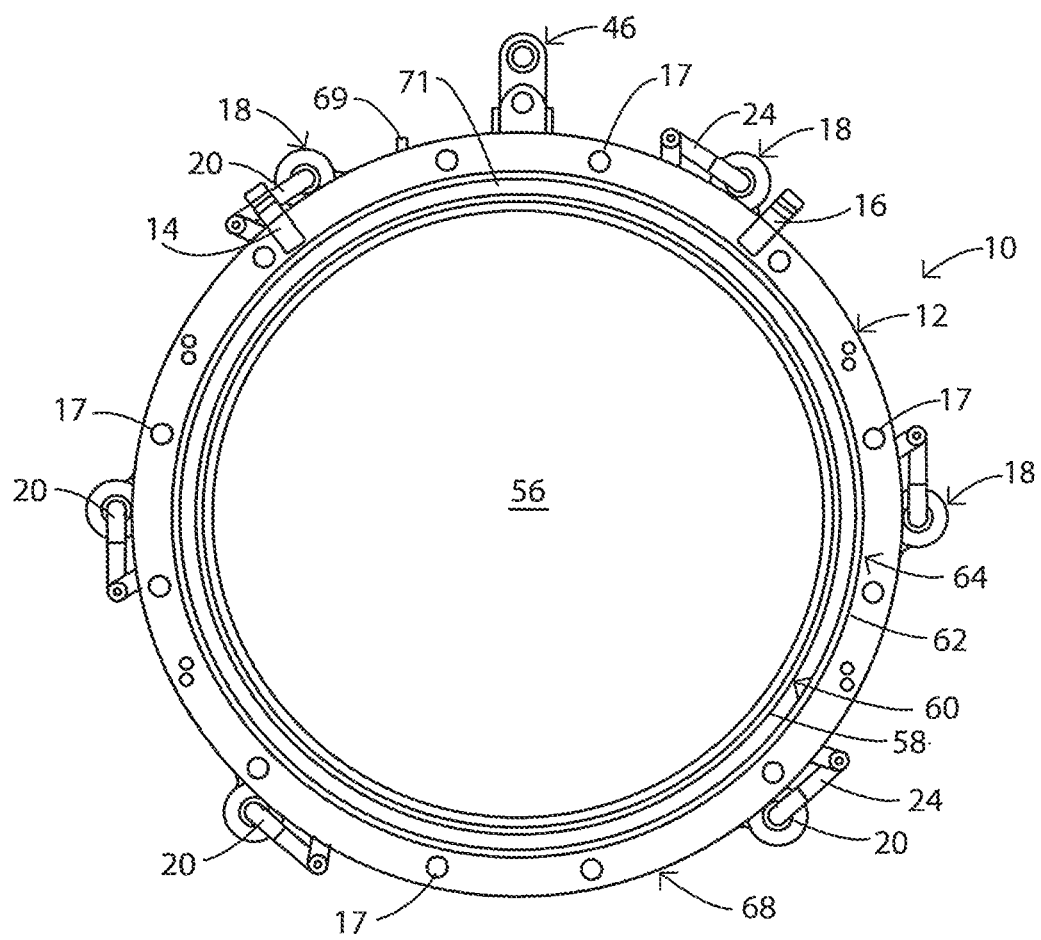
FIG. 4 is a schematic plan view of the fuel transfer tube side of the flange cover assembly illustrated in FIG. 3

Turning now to the drawings an example of a remotely installed fuel closure system embodying the present invention is illustrated therein and in particular to FIGS. 1-4, a flange cover assembly generally designated 10 is a remotely installed flange and clamping mechanism. The flange cover assembly 10 can be installed from the refuel floor level approximately 33 feet above the fuel transfer tube fixed flange. The flange cover assembly 10 includes the same size and type of O-rings as used on known flange covers in the prior art to sealingly cover the opening of the fuel transfer tube. The flange cover assembly 10 also includes an arrangement for testing leakage in the space between the O-rings which is known as a local leak rate test of "LLRT" for short. Two centering guide hooks 14, 16 are bolted or otherwise suitably attached to the upper edges of the flange cover 12. The centering guides 14, 16 are sized to allow the flange cover assembly 10 to be supported vertically and horizontally to provide a maximum spacing between the flange cover 12 and the fuel transfer tube fixed flange of approximately 6 inches while maintaining the outside diameter of the flange cover 12 and the fuel transfer tube fixed flange essentially aligned. The flange cover assembly 10 is lifted, lowered and suspended by a plant crane cable 47 via a releasable connection to a suitably configured flange lift lug 46 attached to the flange cover 12.

In one example of the invention, the flange cover assembly 10 includes a plurality of axially orientated J-bolt spring assemblies generally designated 18 arranged in a spaced relationship with respect to one another and circumferentially distributed along the periphery 68 of the flange cover 12. The J-bolt spring assembly 18, best seen in FIGS. 5-8, includes a bolt foot 20, a bolt shank 70, disk springs 34 and a compression or capture nut 32. The J-bolt is arranged such that the foot 20 of the J-bolt is on the rear or fuel transfer tube side 56 of the flange cover assembly 10. The J-bolt foot 20 is rotated between a non-clamping operative position and a clamping operative position by means of a J-bolt link 24 which functions as a rotation arm and is configured at one end to attach to the J-bolt shank 70 and at its opposite end to a connector bar 26. The opposite end of the connector bar 26 is coupled to a link hub 44. The effective length of the connector bar 26 is shortened when the link hub 44 is rotated from its at rest position in a direction indicated by direction arrow 45, and is lengthened when the link hub 44 is rotated in a direction indicated by direction arrow 47 back to its at rest position. A worm gear 48 is screwed or attached to the link hub 44 and is driven by a worm 50 when the worm drive shaft 52 is caused to rotated by a long pole which is configured to be coupled to the worm drive shaft 52 via a pole receiver 54 attached to the driven end of the worm drive shaft 52.

The flange cover assembly 10 is further configured with attachment lug weldment receivers 36, 38, 40, 42 on the containment side 22 of the flange 12 in a spaced pattern with respect to one another. The attachment lug weldments receivers 36, 38, 40, 42 are arranged and configured for releasable attachment to tool hook weldments 104, 106 carried by an installation/removal frame tool 82 and is described in further detail herein below. Grooves 60 and 62 are machined in the sealing face 66 along the peripheral region 68 on the fuel transfer tube side 56 of the flange cover 12 and arranged to accept O-ring seal 58 and O-ring seal 62 respectively.

Figure 5:
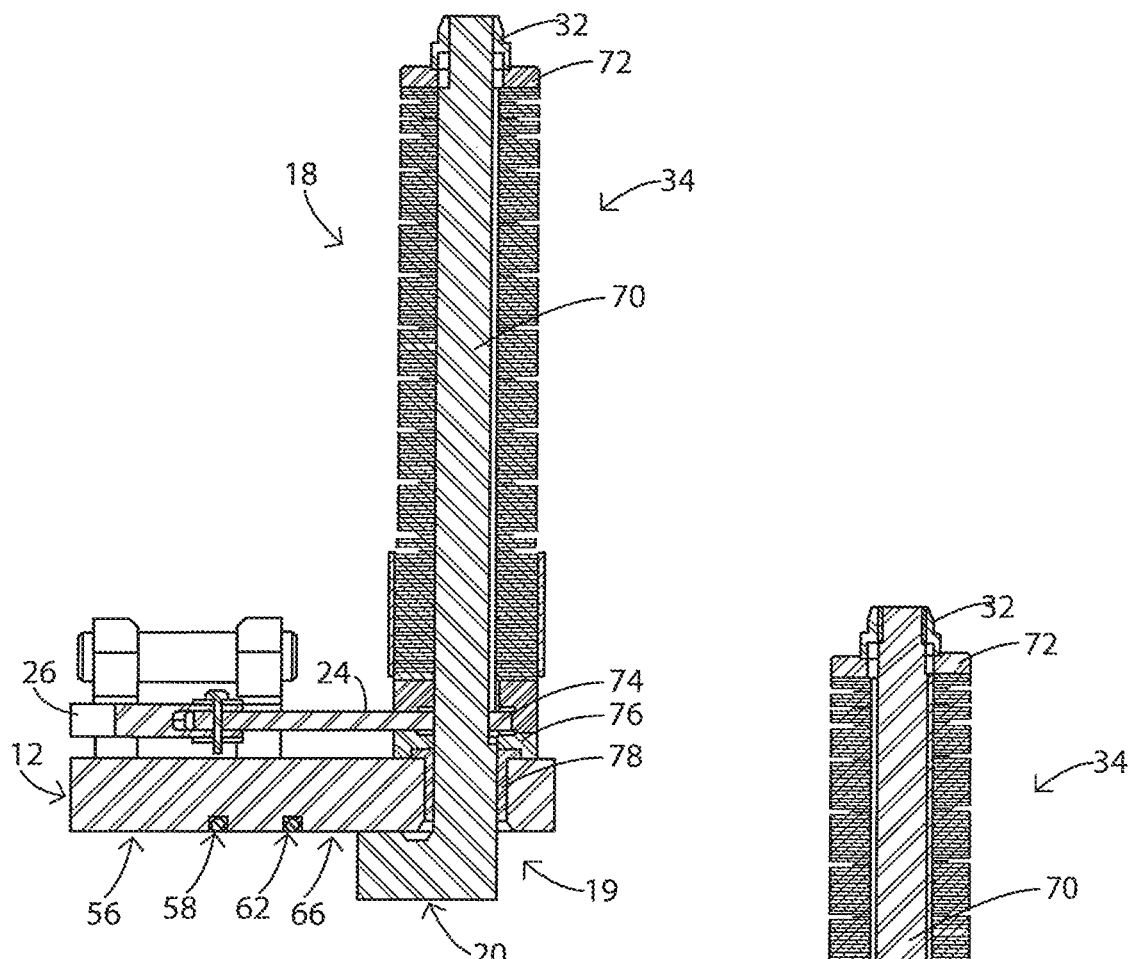
FIG. 5 is a schematic cross-section view of a J-Bolt spring assembly showing the J-Bolt foot retracted and rotated to the clamping operative position.
Figure 6:
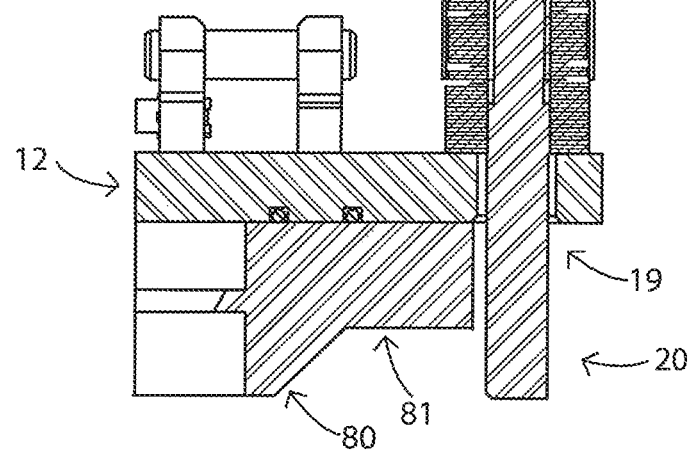
FIG. 6 is a schematic cross-section view of a J-Bolt spring assembly showing the J-Bolt foot disengaged from the fixed flange of the fuel transfer tube and rotated to the non-clamping operative position.
Figure 7:
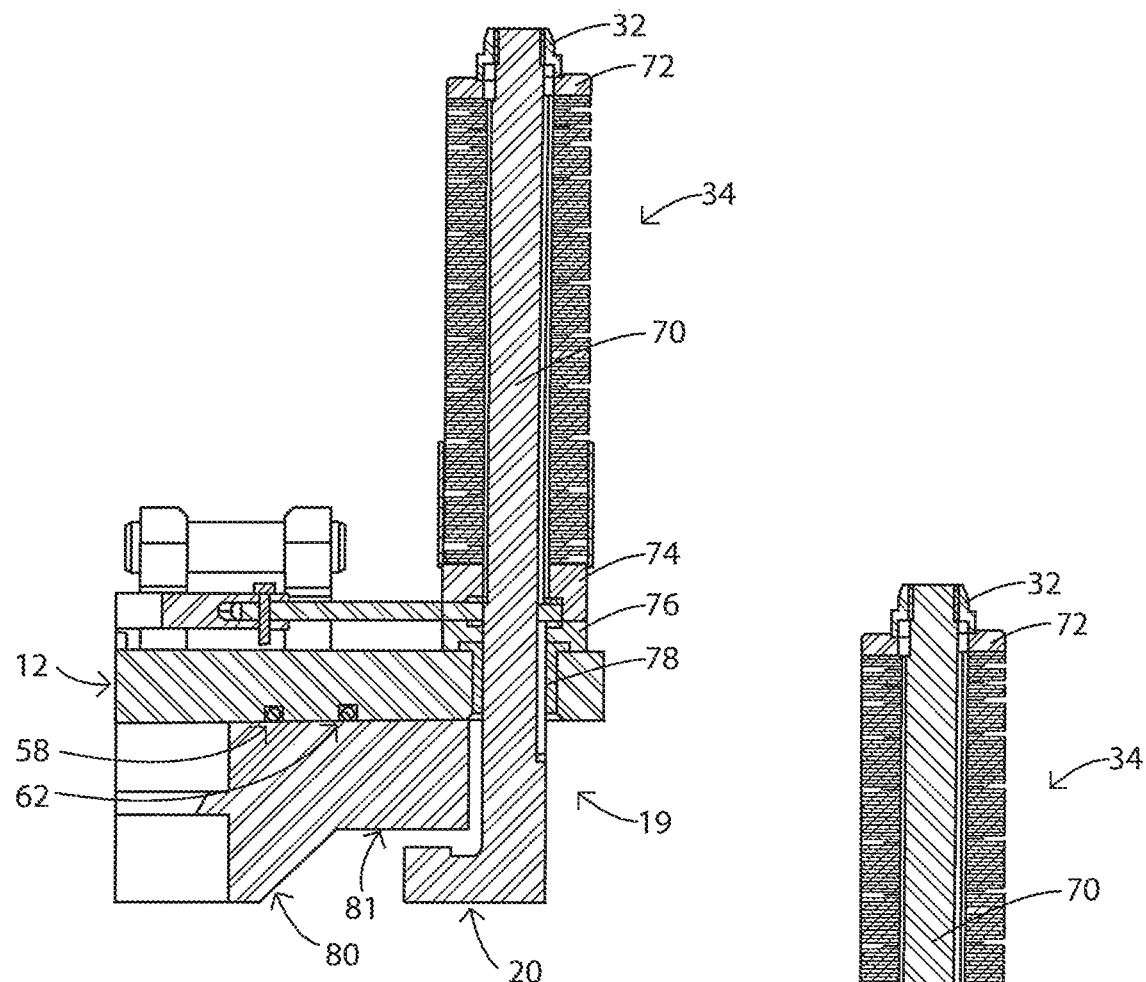
FIG. 7 is a schematic cross-section view of a J-Bolt spring assembly showing the J-Bolt foot rotated, disc springs compressed and J-Bolt extended to the clamping operative position for engagement with the fixed flange of the fuel transfer tube.
Figure 8:
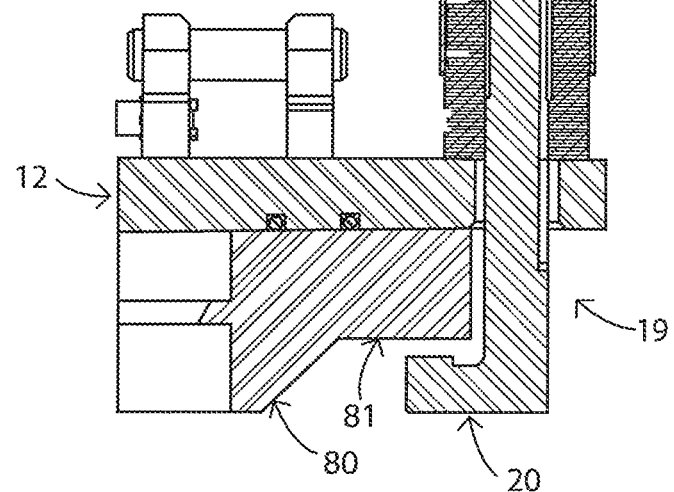
FIG. 8 is a schematic cross-section view of a J-Bolt spring assembly showing the J-Bolt foot rotated to the clamping operative position and engaged with the fixed flange of the fuel transfer tube with the disk springs generating the clamping force
Figure 9:
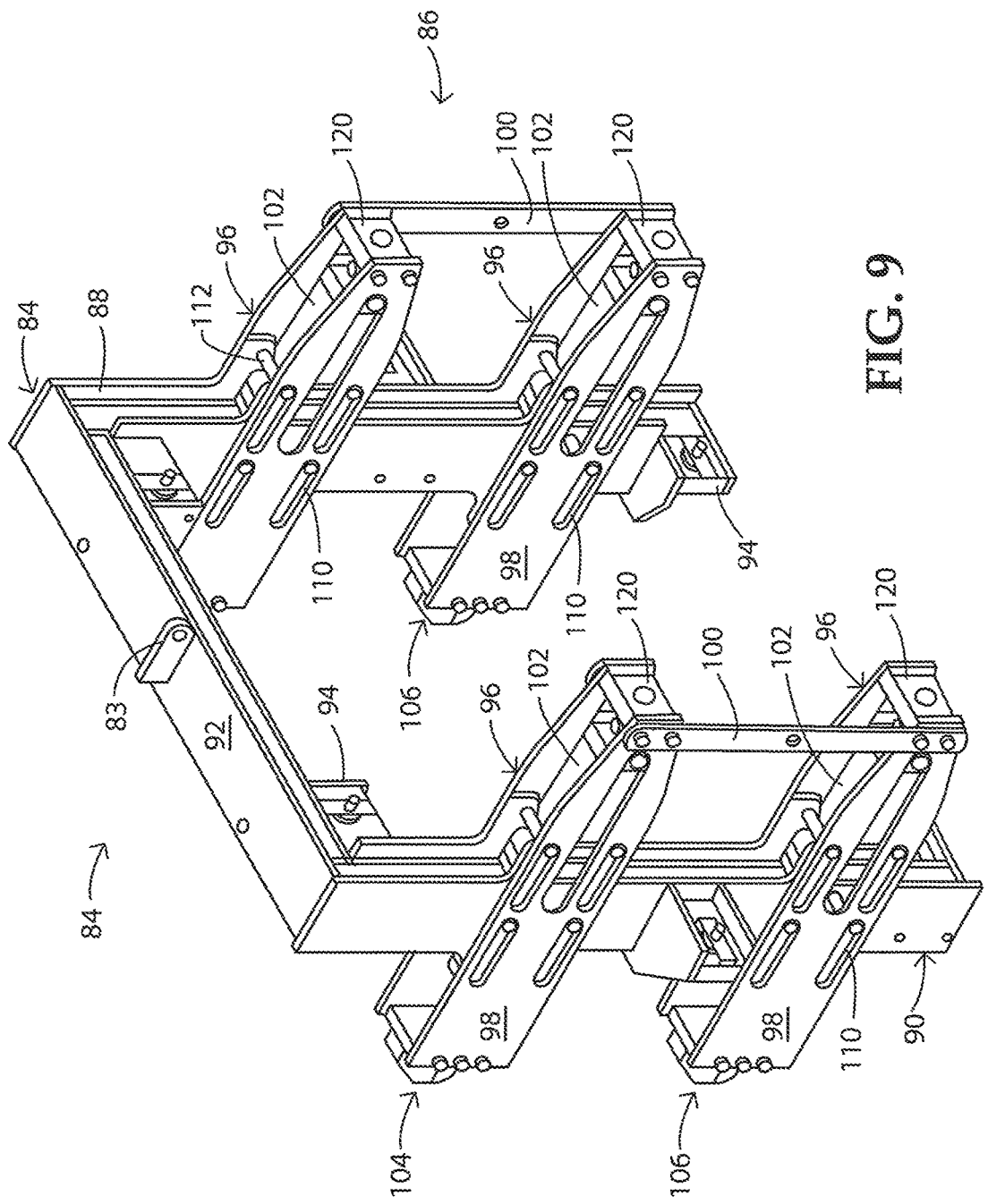
FIG. 9 is a schematic perspective view of the flange cover assembly installation/removal tool frame embodying the present invention as viewed from the rear facing non-attachment side of the tool frame.
Figure 10:
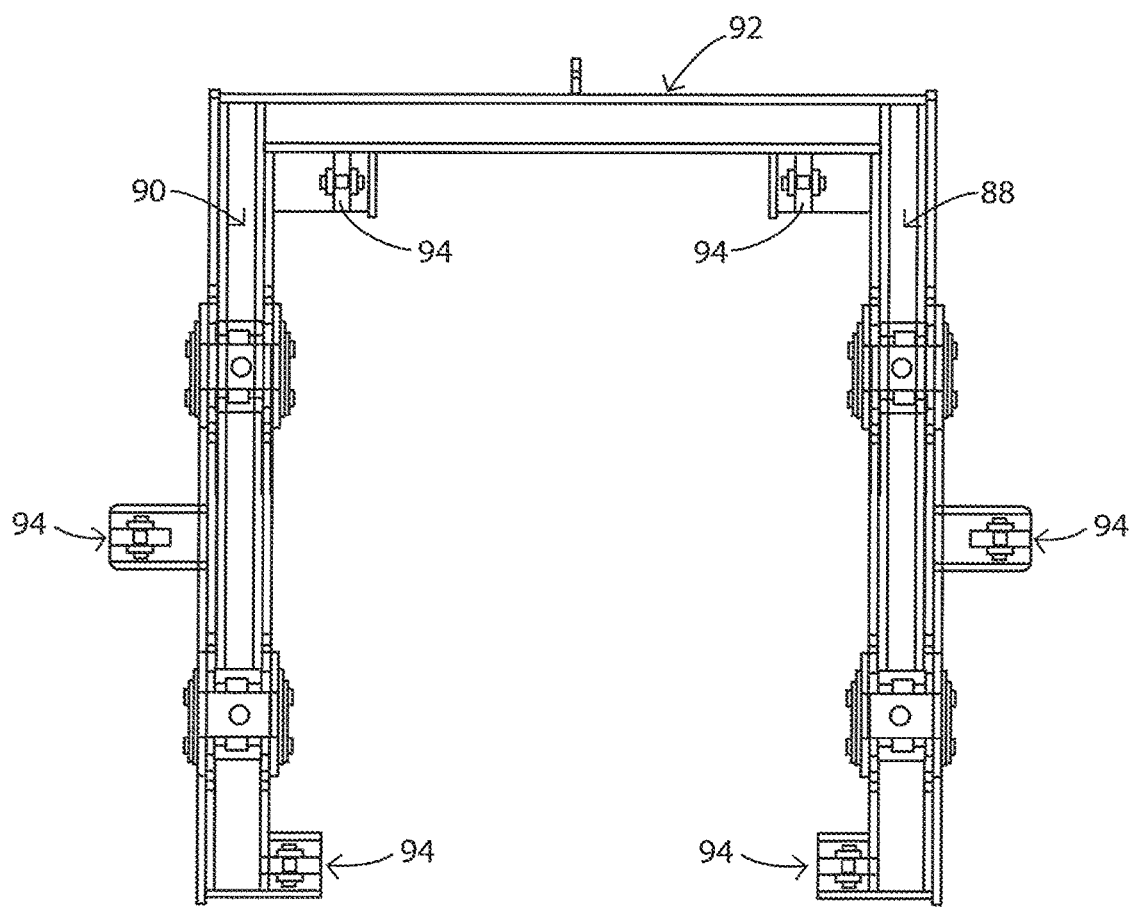
FIG. 10 is a rear plan schematic view of the installation/removal tool frame of FIG. 9 showing the spring compression frame ear with centering ring pattern corresponding to the J-Bolt spring assembly location pattern on the flange cover assembly.
Figure 11:
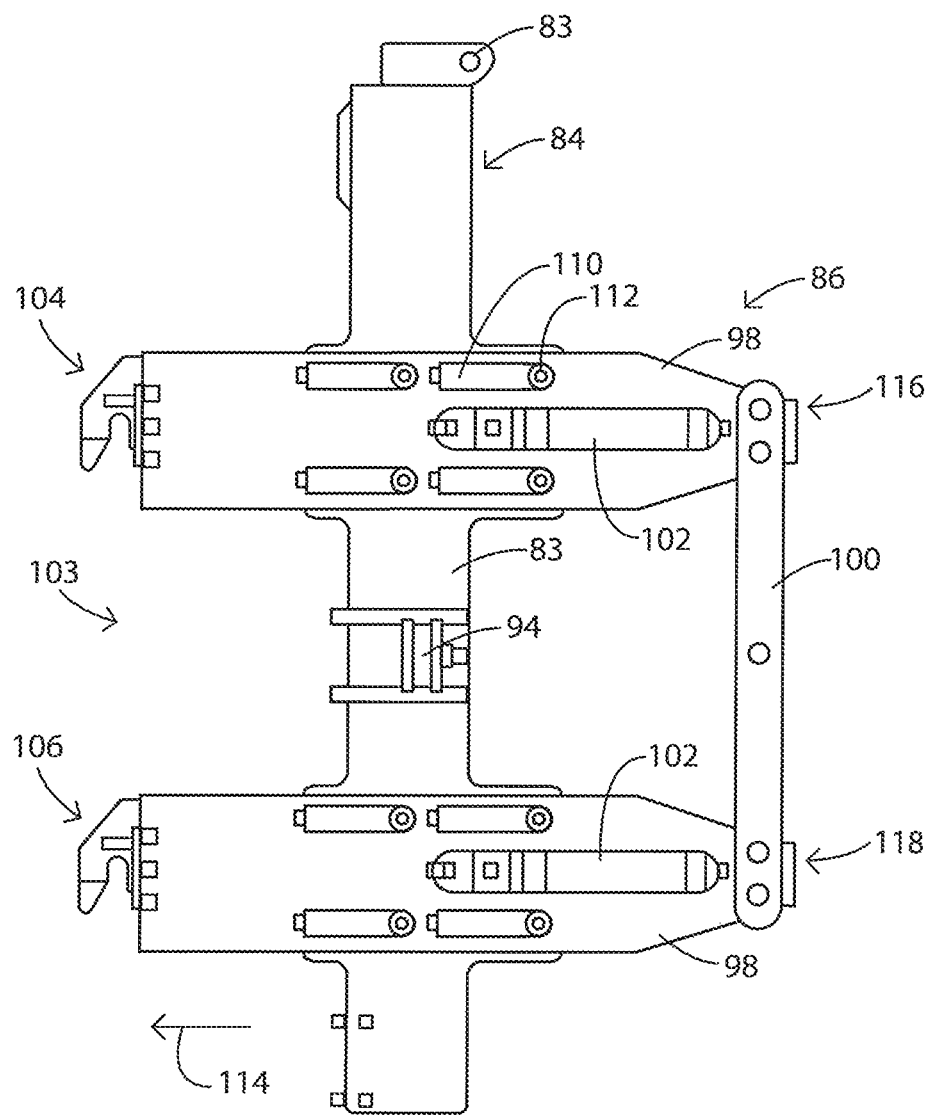
FIG. 11 is a side schematic plan view of the installation/removal tool frame of FIG. 9.
Figure 12:
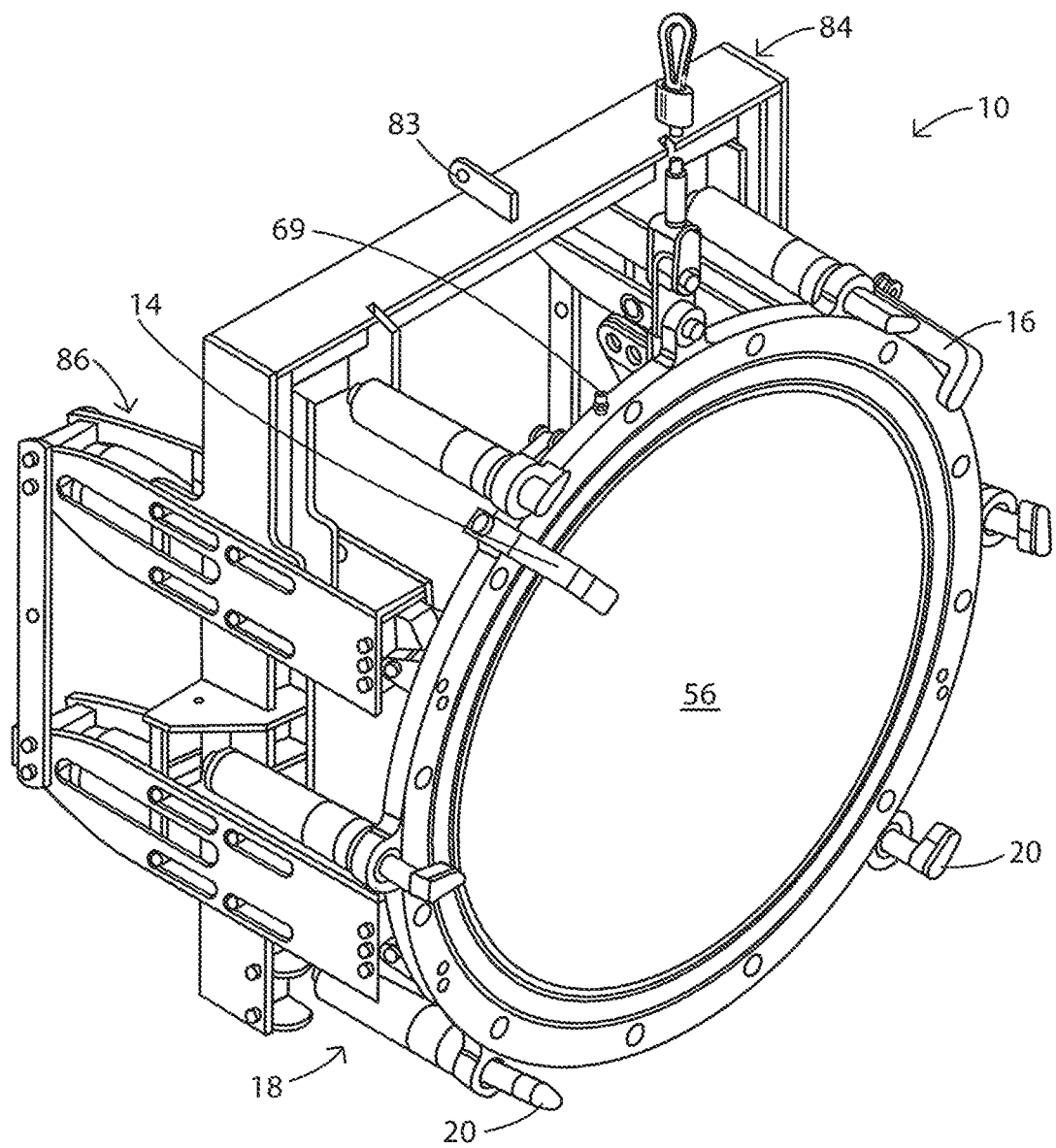
FIG. 12 is a schematic perspective view of the installation/removal tool frame attached to the flange cover assembly as viewed from the fuel transfer tube side showing the J-Bolt feet extended and rotated to the non-clamping operative position.
Figure 13:
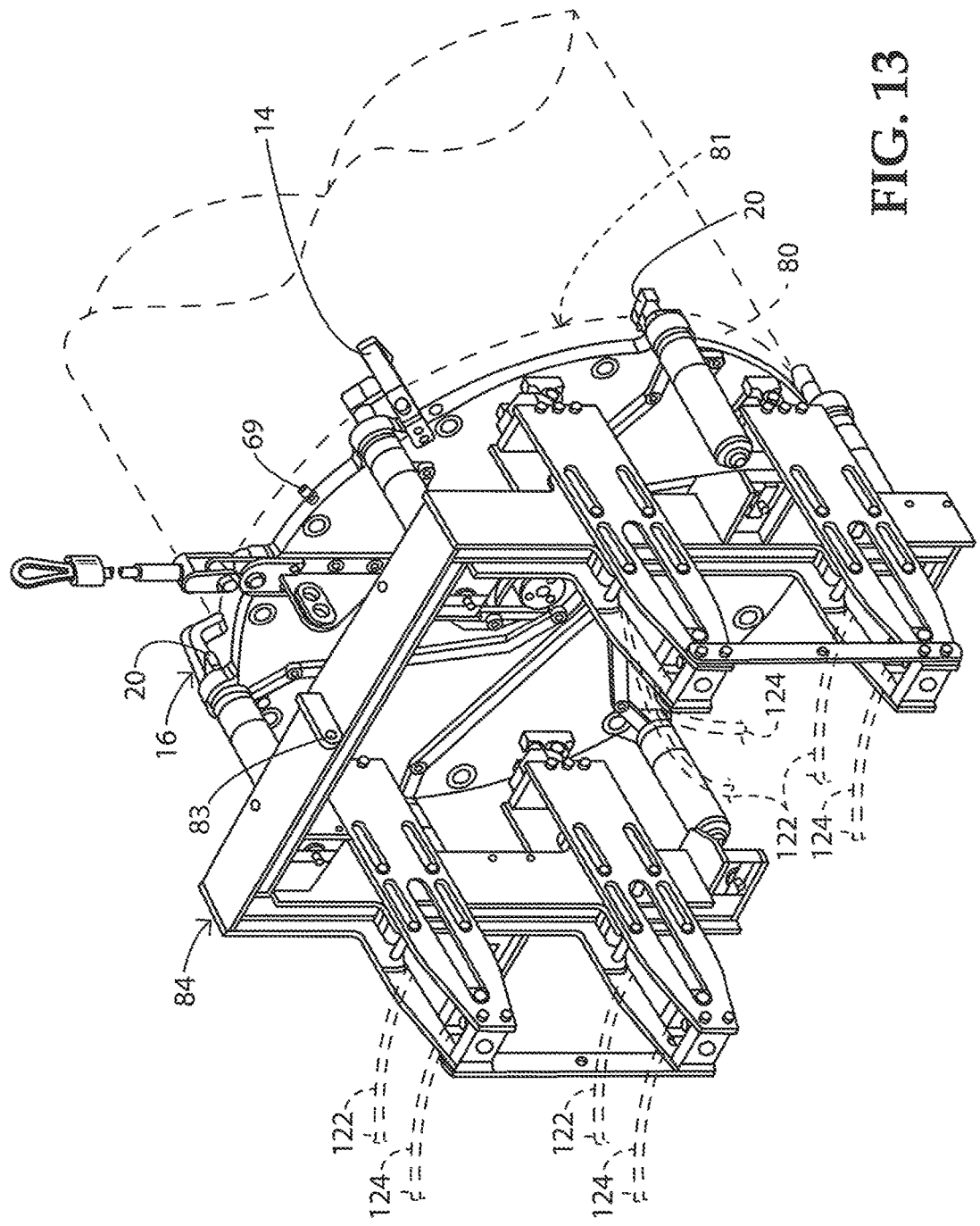
FIG. 13 is a schematic perspective view showing the installation/removal tool frame attached to the flange cover assembly as viewed from the containment side showing the J-Bolt feet rotated and retracted to the clamping operative position.
Figure 14:
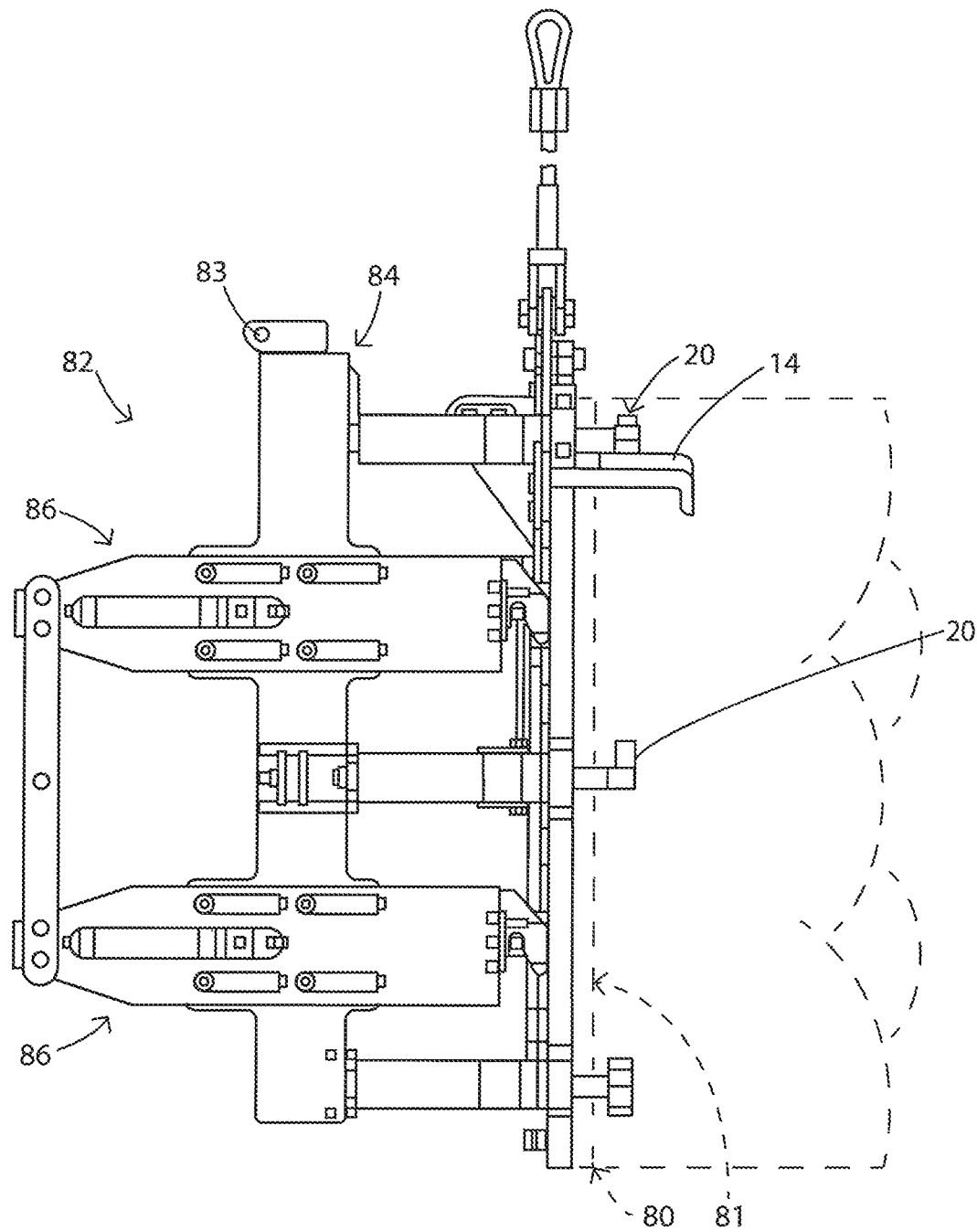
FIG. 14 is a schematic side plan view of the installation/removal tool frame attached to the cover frame assembly shown in FIG. 13.
Figure 15:
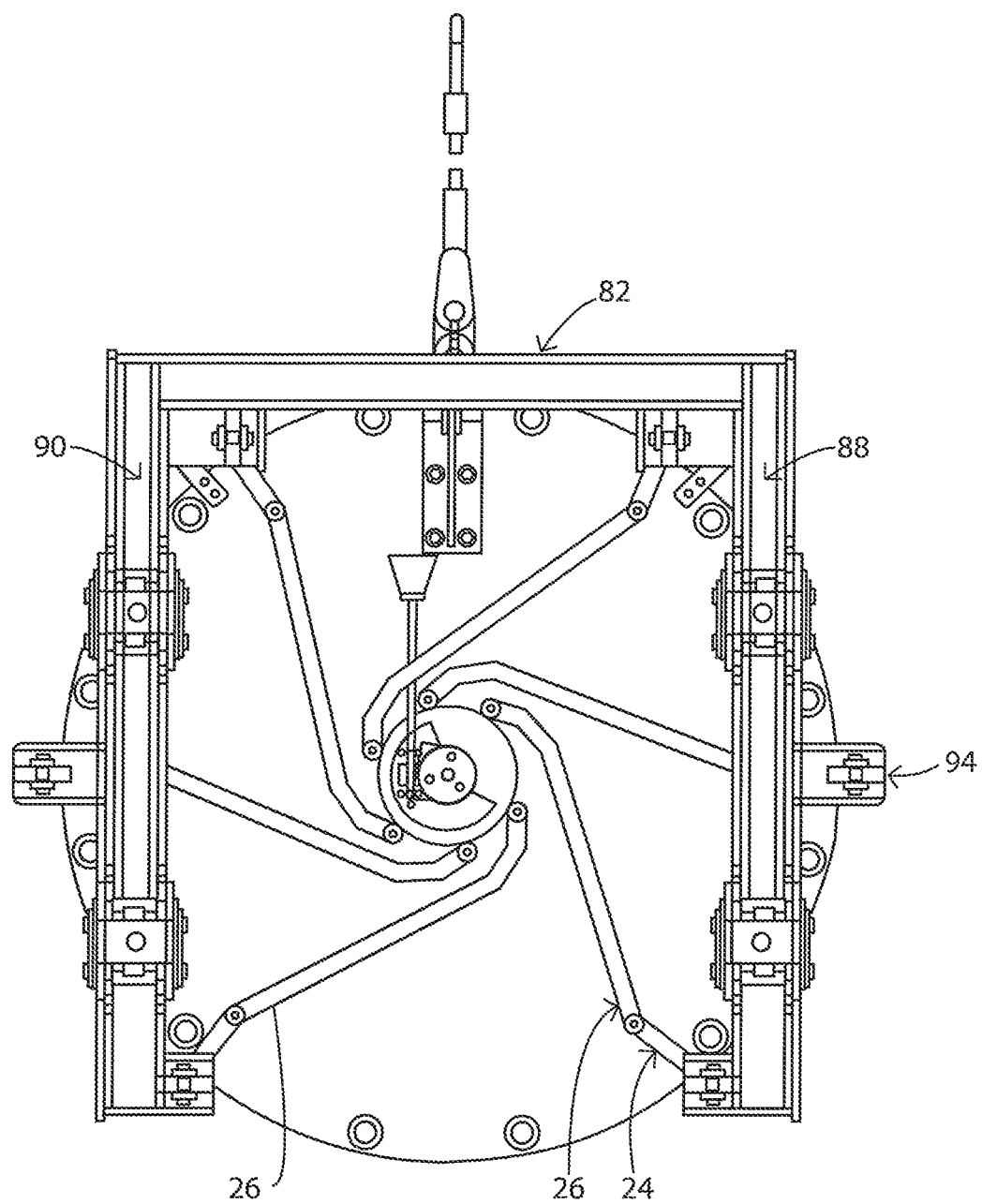
FIG. 15 is a rear schematic plan view showing the installation/removal tool frame attached to the flange cover assembly.

Referring specifically to FIGS. 5-8, the J-bolt spring assembly 18 is arranged such that the foot 20 of the J-bolt 19 is on the fuel transfer tube side 56 of the flange cover 12. The J-bolt foot 20 is sized to allow the foot to be arranged radially to capture and support on the rear side of the fuel transfer tube fixed flange 80 and also to allow an approximate 90 degree rotation as shown in FIG. 6 to permit the J-bolt foot 20 sufficient clearance to pass the outside diameter of the fuel transfer tube fixed flange 80 during storage and during active installation of the flange cover assembly 10. The J-bolts 19 and the disk springs 34 are machined from high strength heat treated stainless steel. The disk springs 34 are arranged in sets of parallel and series springs to allow extension of the J-bolt foot 20 in its non-clamping operative position past the rear side of the fuel transfer tube fixed flange 80 as shown in FIG. 6 and rotated to its clamping operative position as shown in FIG. 7, and to provide sufficient residual clamping force to maintain an O-ring seal under the design conditions as described herein above and as shown in FIG. 8. The disk springs 34 mounted on the J-bolts 19, 19 serve to keep the J-bolt foot 20 fully against the rear sealing face 66 of the flange cover assembly 10 when the disk springs 34 are relaxed as shown in FIG. 5. The disk springs 34 are designed when compressed to allow the J-bolt 19 to extend axially so that the J-bolt foot 20 is approximately 3¼ inch to 3½ inch beyond the rear sealing face 66 to allow sufficient clearance space for the J-bolt 19 to rotate to the clamping operative position while also including adequate space between the mating sealing faces of the flange cover assembly and the fuel transfer tube fixed flange.

Referring to FIGS. 9-14, a tool frame weldment generally designated 82 is used to install and remove the flange cover assembly 10 to and from the fuel transfer tube fixed flange 80. The tool frame 82 includes a spring compression frame 84 and a flange attachment frame 86 arranged and configured for relative movement with respect to one another using dual acting hydraulic cylinders 102. The tool frame including the spring compression frame and attachment frame is made of stainless steel and may be fabricated using any material suitable for the application.

The spring compression frame 84 includes a number of ears with centering rings 94, 94 arranged on side channel bars 88, 90 which are connected at an upper end via a transverse lift bar 92. The ears 94, 94 are arranged in a pattern corresponding to the pattern of the axially extending J-bolt spring assemblies 18, 18 on the flange cover assembly 10.

The flange attachment frame 86 includes tapered and shaped tool hook weldments 104, 106 that are configured to be received by the respective attachment lug weldment receivers 36, 38, 40, 42 on the flange cover assembly 10. The tool hook weldments 104, 106 assist in remotely placing and connecting the tool frame 82 on the flange cover assembly 10 and are positioned at the front end 103 of the tool frame 82 facing the flange cover assembly. Each of the tool hook weldments 104, 106 are carried by spaced parallel side plates 96, 98 arranged to cradle the side bars 88, 90 of the spring compression frame 84. The ends of the side plates 96, 98 opposite the tool hook weldment ends are maintained in the spaced relation by a cylinder rod mounting plate 120. The side plates 96, 98 include elongated lateral slots 110 to guide the side plates along suitably configured roller pins or shoulder screws 112 attached to the respective side bars 88, 90. The respective ends of a tie rod 100 are attached to respective ends 116, 118 of the side plates 96, 98 of the attachment frame 86 to provide additional rigidity to the attachment frame.

A dual acting hydraulic cylinder 102 is configured and arranged between the side plates 96, 98 and includes a piston rod connected to the cylinder rod mounting plate 120 and its opposite body end configured for attachment to the respective side bar 88, 90 of the spring compression frame 84. The dual acting hydraulic cylinder 102 is designed to be pressurized using water as the hydraulic fluid delivered to the cylinder by suitable hydraulic lines or conduits 122, 124. Since water is used as a hydraulic fluid there is no danger of oil contamination form a leaky or split hydraulic hose. The illustrated example of the invention is configured to use four hydraulic cylinders however in other examples of the invention more than four or fewer than four c hydraulic cylinders may be used depending on the specific design.

Once the tool hook weldments 104, 106 are positioned and received in the respective attachment lug weldment receivers 40, 42 on the flange cover assembly 10, the dual acting hydraulic cylinders 120, 120 are pressurized to cause the piston rods to exert a force on the spring compression frame 84 to move the spring compression frame 84 relative to the flange attachment frame 86 in the direction indicated by direction arrow 114 toward the flange cover assembly 10 so that the ears 94, 94 on the spring compression frame 84 to simultaneously push on the ends of the respective J-bolts 19, 19 to compress the disk springs 34 and extend the J-bolt foot 20 toward the rear of the fuel transfer tube fixed flange 80. When the disk springs 34 are fully compressed, a long pole 53 is remotely inserted into the pole receiver 54 and over a nut on the worm drive shaft 52 as discussed above. The worm 50 is rotated and in turn the effective length of the connector bars 26, 26 is shortened causing the J-bolt link rotation arm 24 to rotate with the result that the J-bolt foot 20 is rotated into the clamping operative direction. Once rotated into the clamping operative position the hydraulic pressure on the cylinder is released allowing the disk springs 34 to relax and move the J-bolt foot 20 into clamping engagement against the rear face 81 of the fuel transfer tube fixed flange 80. The residual spring force compresses the O-rings to create the seal between the flange cover 12 and the fuel transfer tube fixed flange 80 under the design conditions as described herein above. The tool frame 52 may be raised using the nuclear plant's crane via a cable connected to a life lug 83 on the transverse lift bar 92. Alternately the tool frame 52 may be left in place.

The tool frame 52 may be used to remove a previously installed flange cover assembly 10. In this example, the tool frame 52 is lowered in its at rest retracted operative position, i.e., the hydraulic cylinders 120, 120 are not pressurized, using the nuclear plant's crane or other available equipment. The tool hook weldments 104, 106 on the tool frame 52 are guided into the corresponding attachment lug weldment receivers 36, 38, 40, 42 on the flange cover assembly 10 and once the tool frame 52 is fixed in place, the hydraulic system pressurizes the hydraulic cylinders 120, 120 to cause the spring compression frame 84 to simultaneously push on the ends of the J-bolts 19, 19 to compress the disk springs 34 and move the feet 20, 20 of the J-bolts 19, 19 away from the rear face 81 of the fuel transfer tube fixed flange 80 and into its non-clamping operative position. The end of a long pole 53 is remotely guided into the pole receiver 54 located on the flange cover assembly 10 and onto the end of the worm drive shaft 52. The pole is rotated to rotate the worm 52 to drive the worm gear 48 to cause the link hub 44 to rotate to lengthen the effective length of the connector bar 26 and rotate the J-bolt link 24 which in turn rotates the J-bolt shank 70 and J-bolt foot 20 to its unlatched operative position. The hydraulic pressure is released and the hydraulic cylinders 120, 120 are pressurized in the opposite direction to move the spring compression frame 84 in a direction away from the front of the tool frame 82 to completely release the J-bolts. The tool frame 82 and the flange cover assembly 10 are then lifted to the refuel floor using the nuclear plant's crane or other available equipment. Any maintenance to the flange cover assembly or the tool frame can be carried out and accomplished on the refuel floor outside of and away from the heat and radiation exposure present in the lower cavity.

The flange cover 12 also includes backup bolt holes 17, circumferentially located on the flange cover perimeter to accept standard bolting in the event of a frame tool, J-bolt spring or other similar failure.

The outer edge of the flange cover 12 has a test connection for carrying out the LLRT or local leak rate test and comprises a pipe nipple 69 installed in a tapped hole and a leak test port 71 which is small diameter hole drilled to intersect with the bottom of the tapped hole to create a passage which allows air pressure to be applied between the O-rings 58 and 62 when the flange cover assembly 10 is clamped to the fuel transfer tube fixed flange. The test pressure is typically at 44 pounds per square inch (psi). As the area is being pressurized a flow meter in line with the test air and the leak test port is used to detect if any flow is present and if so, is it within acceptable limits otherwise the leak must be identified and fixed. A hose is connected to the test connection fitting 69 and remains permanently attached to the flange cover assembly 10. The opposite end of the hose is removed from the test equipment and tied off on the refuel fuel available if further testing is required.

Turning now to FIG. 16 a schematic flow chart showing the functional steps of the method embodying the present invention for remotely installing a flange cover assembly on a fuel transfer tube fixed flange is illustrated therein and generally designated 130. The method includes in step 132 providing a flange cover assembly suitably dimensioned to cover the opening in the fuel transfer tube located in the containment pit of the nuclear power plant. The flange cover assembly is next lowered in step 134 down into the containment pit onto resting engagement and alignment with the fuel transfer tube fixed flange. A frame tool is next lowered down in step 136 and into engagement with the flange cover assembly. Next at least one hydraulic cylinder on the frame tool is pressurized in step 138 to move a spring compression frame into contact with the ends of J-bolt spring assemblies circumferentially distributed on the flange cover. The J-bolt spring assemblies are simultaneously compressed in step 140 to extend the J-bolt feet beyond the rear face of the fuel transfer tube fixed flange and rotated in step 142 into a clamping operative position. The pressure on the hydraulic cylinders is released in step 144 to bring the J-bolt feet into clamping engagement with the fuel transfer tube fixed flange to compress the O-ring seals between the flange cover assembly and the fuel transfer tube fixed flange. The frame tool may now be removed and the space between the O-rings may be pressurized to check for leakage.

Figure 17:
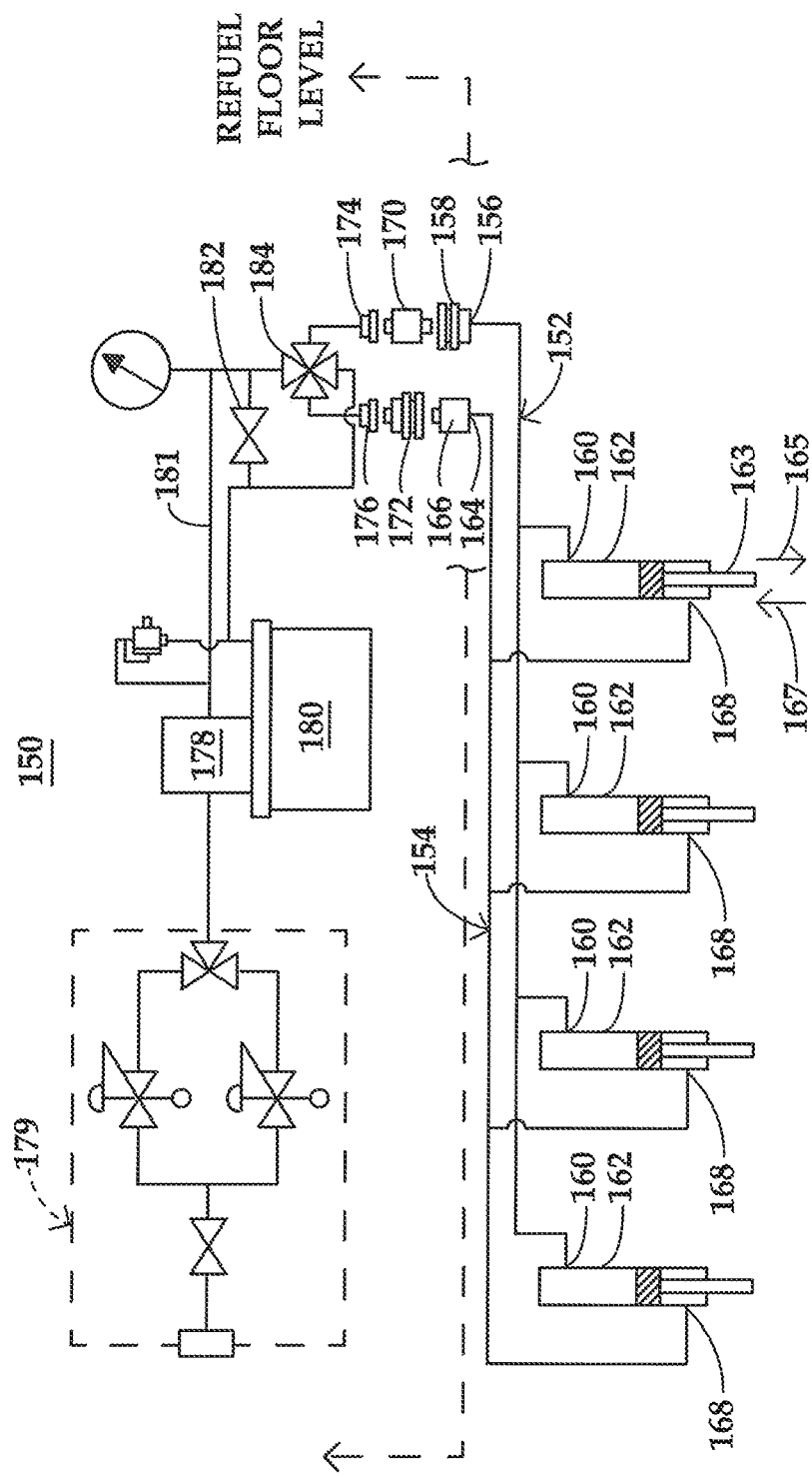
FIG. 17 is a schematic flow diagram of a hydraulic system that may be used to pressurize the dual acting hydraulic cylinders of the tool frame.

Turning now to FIG. 17 a schematic representation of an example of a hydraulic system that may be used with the remotely installed fuel transfer tube closure system to pressurize the dual acting hydraulic cylinders in the tool frame is illustrated therein and designated generally 150. A hydraulic pump 178 is air driven from a source of air 179 and draws water from a water reservoir 180 and delivers the water under pressure via the conduit 181 to a 4-way ball valve 184 which operates in a well known manner to route the water in one direction to one end 156 of a hydraulic hose 152 connected to a quick disconnect socket 158 and the ball valve 184 via a quick disconnect plug 170 located between the quick disconnect socket 158 and bulk head fitting 174 connected to the 4-way valve 184. The opposite end 160 of hydraulic hose 152 is connected to the dual acting cylinder 162 to cause the piston 163 to extend in the direction indicated by direction arrow 165 when the cylinder is pressurized. The 4-way valve is operated to route water to the hydraulic hose 154 having one end 164 connected to a quick disconnect plug 166 and the 4-way valve 184 via a quick disconnect socket 172 located between the quick disconnect plug 166 and the bulk head fitting 176 connected to the 4-way valve 184. The opposite end 168 of the hydraulic hose 154 is connected to the dual acting hydraulic cylinder 162 to cause the piston to retract in the direction indicated by the direction arrow 167 when the cylinder is pressurized. Water is returned to the water reservoir 180 via the conduit 183 by operation of the 4-way valve 184 and 2-way valve 182 in a well-known manner. It will be noted that the hydraulic system and associated controls are at the refuel floor level as are the connections to the hydraulic hoses.

It is to be understood that the above-described arrangements are only illustrative of the application of the principles of the present invention and are not to be construed as limitations of the invention. Numerous modifications and alternative arrangements may be devised by those skilled in the art without departing from the scope of the invention and the appended claims are intended to cover such modifications and arrangements. Further, the invention contemplates all embodiments that may be inferred directly or indirectly from the disclosure and drawings whether or not expressly stated and claimed.

The invention claimed:
1. Apparatus, comprising:
a remotely installed fuel closure system including:
a flange cover assembly configured for releasable attachment to a fixed flange on a fuel transfer tube in a nuclear reactor to sealingly cover the opening of the fuel transfer tube;
an installation/removal tool frame weldment configured with tool hook weldments for releasable attachment to a corresponding lug weldment receiver located on the containment side of said flange cover assembly;
said flange cover assembly further including a plurality of axially oriented J-bolt spring assemblies each comprising a bolt foot, a bolt shank, a capture nut at one end of the bolt shank opposite the bolt foot and a stack of disk springs, said J-bolt assemblies arranged in a spaced relationship with respect to one another and circumferentially distributed along the periphery of the flange cover assembly, said J-bolt shank passing axially through said flange cover such that said bolt foot is on the fuel transfer side of said flange cover and said stacked disk springs are sandwiched between said capture nut and the containment side face of said flange cover;

said bolt foot further being sized and arranged for rotation between an open non-clamping operative position and a closed clamping operative position, and for axial movement in a direction toward and away from the containment side face of said flange cover in response to said stack of disk springs being compressed and relaxed;

said installation/removal tool frame weldment further comprising a tool hook weldment frame and a spring compression frame arranged for limited lateral movement with respect to one another between a tool retracted operative position and a tool actuated operative position.

2. The apparatus as set forth in claim 1 further comprising at least one dual acting hydraulic cylinder configured and arranged between said tool hook weldment frame and said spring compression frame to extend the cylinder piston in a direction to exert a force on the spring compression frame to compress the J-bolt disk springs in the tool actuated operative position.

3. The apparatus as set forth in claim 2 further comprising simultaneously compressing the plurality of J-bolt disk springs in the tool actuated operative position.

4. The apparatus as set forth in claim 1 further comprising at least one dual acting hydraulic cylinder configured and arranged between said tool hook weldment frame and said spring compression frame to retract the cylinder piston in a direction to exert a force on the spring compression frame in a direction to allow the J-bolt disk springs to relax in the tool retracted operative position.

5. The apparatus as set forth in claim 2 further comprising a hydraulic system for pressurizing said dual acting hydraulic cylinder.

6. A remotely installed fuel transfer system comprising:
a flange cover assembly having a central axis and configured for releasable attachment to a fixed flange on a fuel transfer tube to sealingly cover an opening of the fuel transfer tube, wherein the flange cover assembly comprises a fuel transfer side configured to face the fixed flange, and a containment side positioned opposite the fuel transfer side;
an installation/removal tool frame weldment configured with tool hook weldments for releasable attachment to a corresponding lug weldment receiver located on the containment side of said flange cover assembly;
wherein said flange cover assembly further comprises a plurality of axially oriented J-bolt spring assemblies each positioned at least substantially parallel to the central axis of the flange cover and comprising a bolt foot, a bolt shank having an axial axis, a capture nut at one end of the bolt shank opposite the bolt foot and a stack of disk springs, said J-bolt assemblies arranged in a spaced relationship with respect to one another and circumferentially distributed along the periphery of the flange cover assembly, said J-bolt shank passing axially through said flange cover such that said bolt foot is on the fuel transfer side of said flange cover and said stacked disk springs are sandwiched between said capture nut and the containment side face of said flange cover;
said bolt foot further being sized and arranged for rotation about the axial axis of the bolt shank between an open non-clamping operative position and a closed clamping operative position, and for axial movement along the axial axis of the bolt shank in a direction toward and away from the containment side face of said flange cover in response to said stack of disk springs being compressed and relaxed;
said installation/removal tool frame weldment further comprising a tool hook weldment frame and a spring compression frame arranged for limited lateral movement with respect to one another between a tool retracted operative position and a tool actuated operative position.

* * * * *